United States Patent
Marsolek

(10) Patent No.: US 9,481,964 B1
(45) Date of Patent: Nov. 1, 2016

(54) SYSTEM FOR COMMUNICATIONS BETWEEN PLANT AND MACHINES

(71) Applicant: Caterpillar Paving Products Inc., Brooklyn Park, MN (US)

(72) Inventor: John L. Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 14/835,081

(22) Filed: Aug. 25, 2015

(51) Int. Cl.
| | |
|---|---|
| *E01C 19/10* | (2006.01) |
| *E01C 19/00* | (2006.01) |
| *E01C 19/20* | (2006.01) |
| *E01C 19/46* | (2006.01) |
| *G08G 1/00* | (2006.01) |
| *G01C 21/34* | (2006.01) |
| *G01S 19/14* | (2010.01) |
| *G06Q 10/06* | (2012.01) |

(52) U.S. Cl.
CPC ......... *E01C 19/1063* (2013.01); *E01C 19/002* (2013.01); *E01C 19/004* (2013.01); *E01C 19/1068* (2013.01); *E01C 19/20* (2013.01); *E01C 19/46* (2013.01); *G01C 21/3492* (2013.01); *G01S 19/14* (2013.01); *G06Q 10/06313* (2013.01); *G08G 1/20* (2013.01)

(58) Field of Classification Search
CPC ............. E01C 19/1063; E01C 19/002; E01C 19/004; E01C 19/1068; E01C 19/20; E01C 19/46; G08G 1/20; G01C 21/3492; G01S 19/14; G06Q 10/06313
See application file for complete search history.

(56) References Cited

U.S. PATENT DOCUMENTS

| | | | |
|---|---|---|---|
| 6,805,516 B2 | 10/2004 | Barnat et al. | |
| 6,862,521 B1 * | 3/2005 | Fox .................. | G01C 21/00 340/994 |
| 8,099,218 B2 | 1/2012 | Glee et al. | |
| 8,517,628 B2 | 8/2013 | Weiser et al. | |
| 8,744,646 B2 | 6/2014 | Buschmann et al. | |
| 8,930,092 B2 | 1/2015 | Minich | |
| 8,940,360 B1 * | 1/2015 | Brasier .................. | E01C 11/005 427/136 |
| 9,011,038 B2 | 4/2015 | Buschmann et al. | |
| 2004/0260504 A1 * | 12/2004 | Bienvenu ................ | E01C 19/00 702/127 |
| 2009/0142133 A1 * | 6/2009 | Glee ..................... | E01C 19/004 404/75 |
| 2012/0271489 A1 * | 10/2012 | Roberts ................. | G08G 1/207 701/2 |
| 2013/0290062 A1 | 10/2013 | Patel et al. | |

FOREIGN PATENT DOCUMENTS

EP        0667415 B1      3/1999

* cited by examiner

*Primary Examiner* — Russell Frejd
(74) *Attorney, Agent, or Firm* — Leydig, Voit & Mayer, Ltd.

(57) ABSTRACT

A system for controlling a paving system includes a plurality of supply machines, a paving machine, and a plant. A first controller determines the position of each supply machine. A second controller determines the rate at which paving material is being applied to a work surface and transmits the rate at which the paving material is being applied. A temperature sensor is associated with one of the plurality of supply machines and the paving machine for determining a temperature of paving material at the paving machine. The plant is configured to produce a batch of paving material and a third controller determines a batch temperature, and generates instructions indicative of a desired route for each supply machine between the plant and the paving machine based upon the position of each supply machine, traffic information data, the batch temperature, and the temperature of paving material at the paving machine.

20 Claims, 6 Drawing Sheets

SYSTEM FOR COMMUNICATIONS BETWEEN PLANT AND MACHINES

TECHNICAL FIELD

This disclosure relates generally to a system for communicating between a plant and machines and, more particularly, to a system and method for communicating between a plant, a paving machine, and a supply machine by utilizing a wireless communications system.

BACKGROUND

When performing paving operations, paving machines, haul trucks, and remixing transfer vehicles are typically used to perform a variety of tasks, and move about a work site. The operation of these machines must be coordinated to perform a paving operation in an efficient manner. Communication between the operators of the machines may be difficult and is sometimes coordinated by personnel or systems at a remote location such as at a material supply plant.

U.S. Patent Publication No. 2013/0290062 discloses a system for coordinating activities of a paving operation. Communications between a paving machine and a transport truck is accomplished through a server. Information regarding the work site and the machines at the work site is routed through the server.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for controlling a paving system includes a plurality of supply machines, a paving machine, and a plant. Each supply machine includes a first ground engaging drive mechanism to propel the supply machine, a material transport unit in which a load of paving material may be transported, a first position sensor for determining a position of the supply machine, and a first wireless communications system on the supply machine. A first controller is configured to determine the position of the supply machine and transmit supply machine position signals indicative of the position of the supply machine. The paving machine includes a second ground engaging drive mechanism mover to propel the paving machine, a material receiving unit for receiving paving material from the supply machine, a material application system for applying the paving material to a work surface, a second sensor for determining a rate at which the paving material is being applied to the work surface, and a second wireless communications system on the paving machine. A second controller is configured to determine the rate at which the paving material is being applied to the work surface and transmit the rate at which the paving material is being applied. A temperature sensor is associated with one of the plurality of supply machines and the paving machine for determining a temperature of paving material at the paving machine. The plant is configured to produce a batch of paving material and includes a holding location at which the batch of paving material is held, a batch temperature sensor for determining a batch temperature of the batch of paving material, and a third wireless communications system at the plant. A third controller is configured to determine the batch temperature, receive signals indicative of the position of each supply machine, receive traffic information data indicative of traffic conditions between the plant and the paving machine, receive signals indicative of the temperature of paving material at the paving machine, and generate instructions indicative of a desired route for each supply machine between the plant and the paving machine based upon the position of each supply machine, the traffic information data, the batch temperature, and the temperature of paving material at the paving machine.

In another aspect, a method of controlling a paving system includes propelling a plurality of supply machines with each of the plurality of supply machines having a material transport unit in which a load of paving material may be transported and at least some of the plurality of supply machines transporting paving material, determining a position of each of the plurality of supply machines, and transmitting via a first controller supply machine position signals indicative of the position of each supply machine. The method further includes propelling a paving machine with the paving machine including a material receiving unit for receiving paving material from one of the plurality of supply machines and a material application system for applying a paving material to a work surface, determining a rate at which the paving material is being applied to the work surface by the material application system, transmitting via a second controller the rate at which the paving material is being applied. A temperature of paving material at the paving machine is determined. Still further, the method includes producing a batch of paving material at a plant and holding the batch of paving material at a holding location, determining a batch temperature of the batch of paving material, receiving at a third controller signals indicative of the position of each supply machine, receiving at the third controller traffic information data indicative of traffic conditions between the plant and the paving machine, receiving at the third controller signals indicative of the temperature of paving material at the paving machine, and generating at the third controller instructions indicative of a desired route for each supply machine between the plant and the paving machine based upon the position of each supply machine, the traffic information data, the batch temperature, and the temperature of paving material at the paving machine.

DETAILED DESCRIPTION

Figure 1:
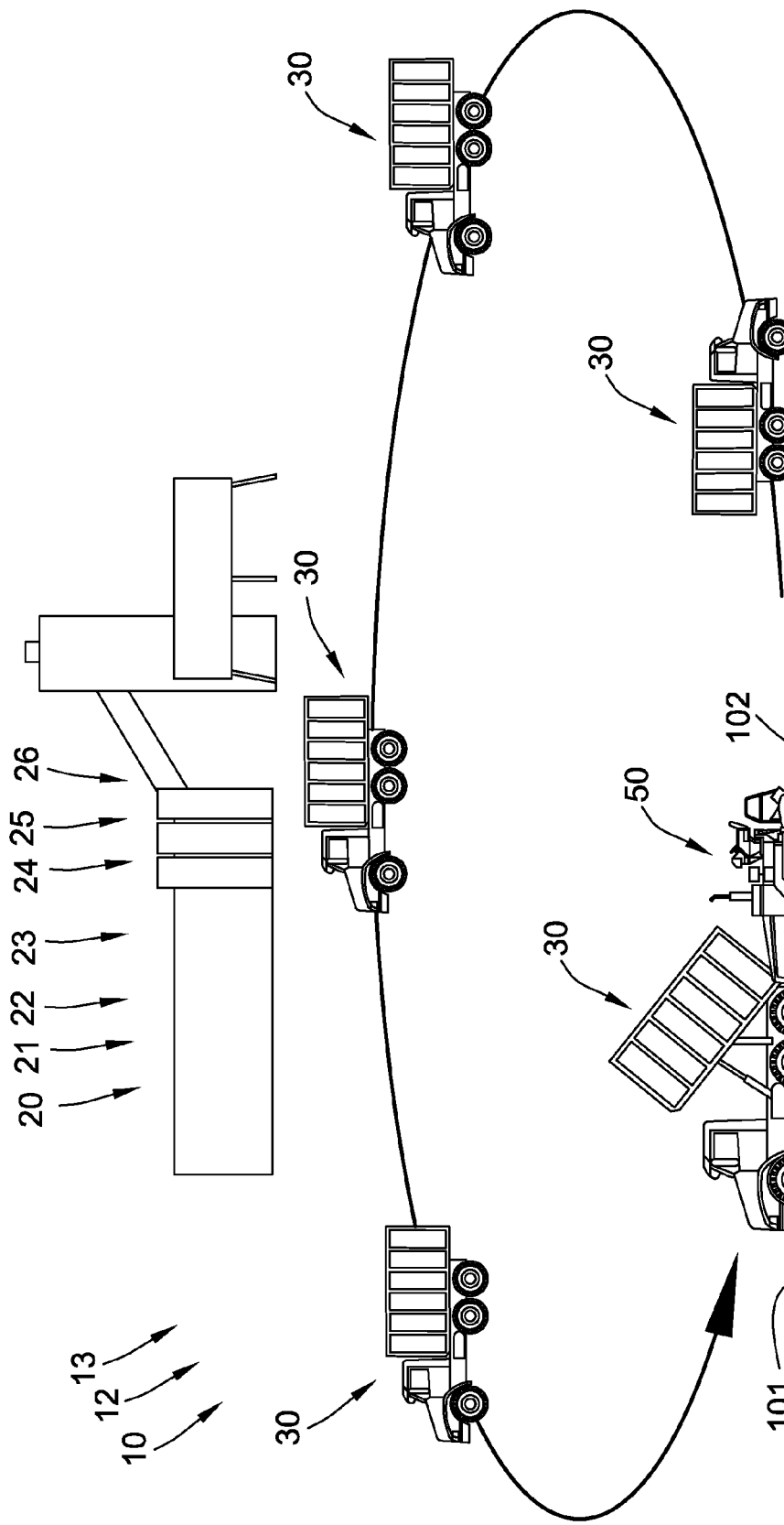
FIG. 1 depicts a schematic illustration of a paving system according to the disclosure.

Referring to FIG. 1, a paving system is generally depicted at 10. The paving system 10 includes one or more plants 20 for producing a paving material such as asphalt, and a plurality of machines such as one or more supply machines (e.g., haul trucks 30) for transporting paving material, and one or more paving machines 50 for applying a layer 102 of paving material such as asphalt to a work surface 101 at a paving site 100. Other machines, such as compactors (not shown) and remixing transfer vehicles (not shown) may also form a portion of the paving system 10. Paving site 100 may include, for example, a construction site, a roadwork site, a parking lot, or any other type of work site.

A control system generally indicated at 12 associated with the paving system 10 may operate to control certain aspects of the paving system and also communicate information between the machines and between the machines and the plant 20. The control system 12 may include control systems of the plant 20 and each of the machines.

The control system 12 may include an electronic control module or controller 13. The controller 13 may receive input signals from the plant 20 and each of the machines associated with the paving system 10. The controller 13 may also receive input signals from systems outside of the paving system such as GPS signals and signals indicative of traffic and weather that may affect the operation of the paving system 10 or the paving process. The controller 13 may control the operation of various aspects of the plant 20 and the operation of the machines of the paving system 10 as well as generate desired communications, as described in more detail below.

The controller 13 may be an electronic controller that operates in a logical fashion to perform operations, execute control algorithms, store and retrieve data and other desired operations. The controller 13 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 13 such as power supply circuitry, signal conditioning circuitry, driver circuitry, and other types of circuitry.

The controller 13 may be a single controller or may include more than one controller (such as those associated with each of the plant 20 and the machines of the paving system 10) disposed to control various functions and/or features of the paving system 10. The term "controller" is meant to be used in its broadest sense to include one or more controllers and/or microprocessors that may be associated with the paving system 10 and that may cooperate in controlling various functions and operations of the plant 20 and the machines of the paving system. The functionality of the controller 13 may be implemented in hardware and/or software without regard to the functionality. The controller 13 may rely on one or more data maps relating to the operating conditions and the operating environment of the paving system 10 that may be stored in the memory of controller. Each of these data maps may include a collection of data in the form of tables, graphs, and/or equations to maximize the performance and efficiency of the paving system 10 and its operation.

Plant 20 may produce paving material such as asphalt from bitumen, aggregate, and other materials or fillers. The paving material is often produced in batches with each batch stored or held in a separate storage or holding location such as a silo until it is loaded into a haul truck 30 at a loading station. Each holding location may be dedicated to storing or holding paving material for a particular paving site 100 and paving material within a particular holding location is periodically loaded into a haul truck for transport to the paving site 100. The characteristics of each batch stored within a holding location may be set based upon the desired characteristics for a particular paving job. For example, the amount of oil and the size of the aggregate may be set based upon the desired characteristics of the paving material and the requirements of each paving job.

Each batch may be periodically or continuously mixed at the holding location and maintained at a desired temperature. The temperature at which the paving material is maintained may be set based upon a desired temperature at which the paving material will be loaded into the haul trucks. Such loading temperature may be based upon the desired temperature at which the load will be delivered to the paving machine 50, the ambient temperature of the air, the expected time required for the haul truck 30 to drive from the plant 20 to the paving machine 50 as well as any expected or anticipated waiting time for the truck at the paving site.

Plant 20 may include a plant control system 21 and a plant controller 22 generally similar or identical to the control system 12 and the controller 13 of the paving system 10, respectively, described above. The plant control system 21 and the plant controller 22 may be located at the plant 20 and may also include components located remotely from the plant such as on any of the machines of the paving system 10 or at a command center (not shown). The functionality of plant controller 22 may be distributed so that certain functions are performed at plant 20 and other functions are performed remotely.

Plant 20 may also include a plurality of plant sensors indicated generally at 23 such as batch temperature sensors indicated generally at 24 operative to monitor the temperature of the batch of paving material within each holding location. The term "sensor" is used herein in its broadest sense to include one or more sensors and related components that may cooperate to sense various functions, operations, and operating characteristics of a machine or system and/or aspects of the environment in which the machine or system is operating. Plant 20 may also include a volume or weight sensing system 25 for determining an amount of material remaining at the holding location. A loading sensor system 26 may be provided to determine an amount of material being loaded onto a haul truck 30 at the loading station.

Information regarding the plant 20 and the paving material may be stored or determined by plant controller 22 or any other portion of controller 13. Some of the information may be relatively static (i.e., static or fixed for each batch of paving material) and other information may be dynamic or change. Examples of static information include a unique identifier associated with the batch. Dynamic information that may be stored or determined by the plant controller 22 or controller 13 includes the amount and temperature of the material within the holding location at the plant 20. In many instances, the characteristics of each batch (e.g., amount of oil and size of the aggregate) may be static information. However, in some instances, the characteristics of each batch may change or be modified based upon the feedback or requests from the paving location or other personnel and thus may be considered dynamic information.

Haul truck 30 may be operative to transport paving material between plant 20 and a paving machine 50. More specifically, a haul truck 30 may be positioned at plant 20 adjacent the holding location and loaded with paving material at a desired temperature. The haul truck 30 may then travel to the appropriate paving machine 50 or a remixing transfer vehicle (not shown) and subsequently applied to the work surface 101 as a layer of paving material.

Figure 2:
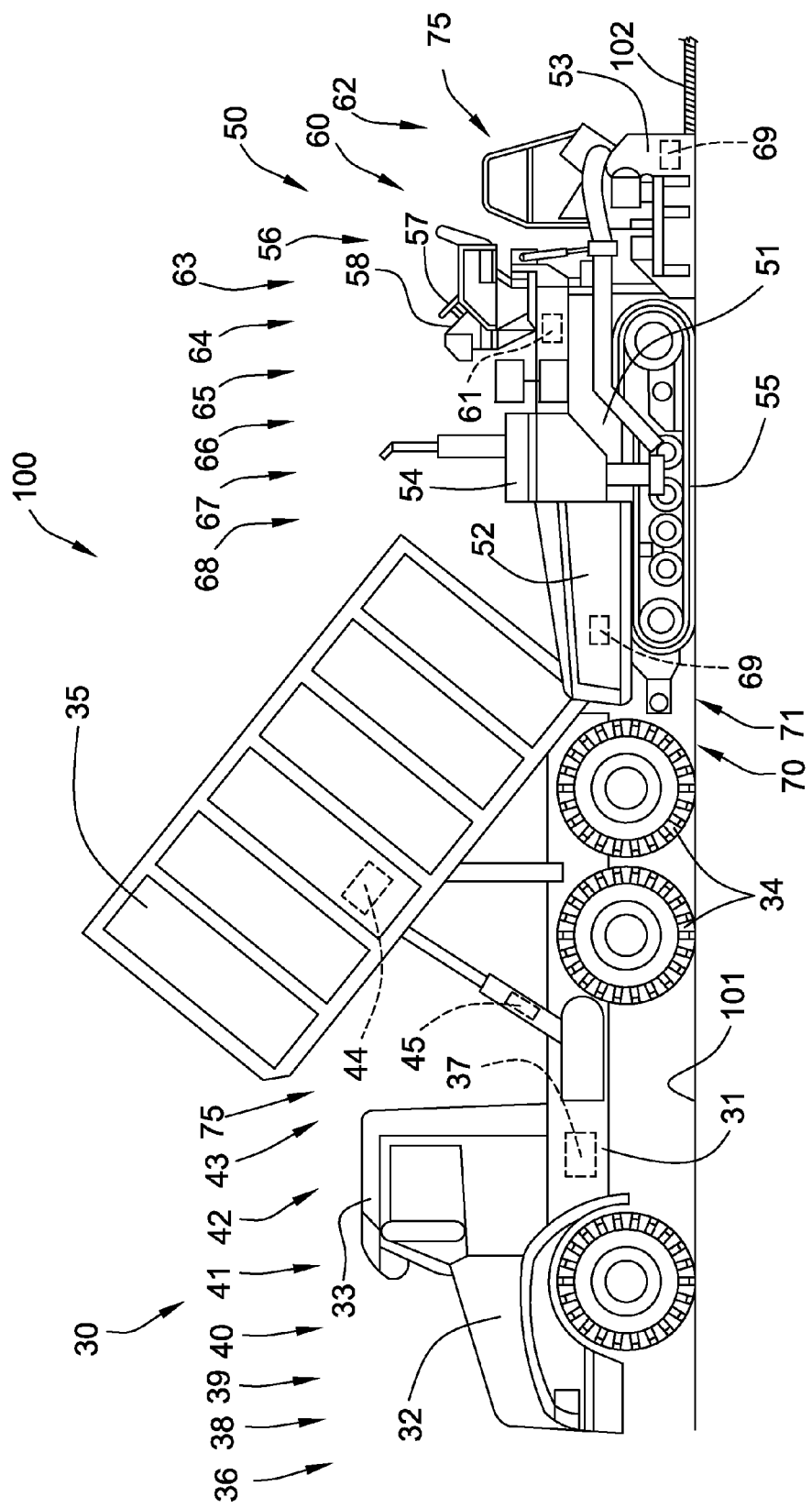
FIG. 2 depicts a schematic illustration of a work site at which a paving machine and a haul truck are performing a paving operation.

Referring to FIG. 2, each haul truck 30 may include a chassis 31 that supports a prime mover such as an engine 32 and a cab 33 in which an operator may be positioned to provide input instructions to operate the truck. The engine 32 is operatively connected to and drives a ground engaging drive mechanism such as wheels 34. A material transport unit such as a dump body 35 is pivotally mounted on the chassis 31 and receives a payload to be hauled from one location to another.

Haul truck 30 may include a truck control system 36 and a truck controller 37 generally similar or identical to the plant control system 21 and the plant controller 22 of the plant 20, respectively. The truck control system 36 and the truck controller 37 may be located on the haul truck 30 and may also include components located remotely from the haul truck such as on any of the other machines of the paving system 10, at the plant 20, or at a command center (not shown). The functionality of truck controller 37 may be distributed so that certain functions are performed on the haul truck 30 and other functions are performed remotely.

Haul truck 30 may be equipped with a plurality of truck sensors 38, as shown generally by an arrow in FIG. 1 indicating association with the haul truck, that provide data indicative (directly or indirectly) of various operating parameters of the truck, systems associated with the truck, and/or the operating environment in which the truck is operating.

A position sensing system 39, as shown generally by an arrow in FIG. 1 indicating association with the haul truck 30, may include a position sensor 40, also shown generally by an arrow in FIG. 1, to sense the position of the truck. The position sensor 40 may include a plurality of individual sensors that cooperate to generate and provide position signals to truck controller 37 indicative of the position and orientation of the haul truck 30.

The position sensor 40 may include one or more sensors that interact with a positioning system such as a global navigation satellite system or a global positioning system to operate as a position sensor. The truck controller 37 may use position signals from the position sensor 40 to determine the position of the haul truck 30 relative to an earth reference (e.g., GPS) or relative to another machine such as paving machine 50 or relative to the plant 20.

A slope or inclination sensor such as pitch angle sensor 41 for measuring the slope or inclination of the haul truck 30 relative to a ground or earth reference may be provided as a dedicated or standalone sensor or as part of position sensor 40. A ground speed sensor 42 for determining the ground speed and heading of the haul truck 30 may be provided as a dedicated or standalone sensor or as part of position sensor 40. Alternatively, if desired, the position sensing system 39 may also be used to determine the ground speed and heading of the haul truck 30.

Haul truck 30 may also include a load monitoring system 43 for determining the load or amount of material within the dump body 35. A temperature sensor 44 and a pivot position sensor 45 may be associated with the dump body 35. The temperature sensor 44 may be used to monitor the temperature of the load (e.g., paving material) within the dump body 35 and the pivot position sensor 45 may be used to monitor the position of the dump body relative to the chassis 31 to control the flow of material from the dump body.

Information regarding the haul truck 30 and its payload may be stored or determined by truck controller 37 or any other portion of controller 13. Some of the information may be relatively static (i.e., static or fixed for each haul cycle) and other information may be dynamic or change during a hauling operation. Examples of static information include a unique identifier associated with the haul truck, the plant, and/or the load and the type of load within the dump body (e.g., asphalt, re-claimed asphalt). Dynamic information that may be stored or determined by the truck controller 37 or controller 13 and associated with the haul truck 30 and the payload includes position, slope, and ground speed of the truck, the amount and temperature of the material within the dump body 35, and the position of the dump body relative to the chassis 31.

Paving machine 50 may be operative to apply a layer of paving material to work surface 101. More specifically, paving machine 50 is supplied with paving material by an aligned haul truck 30 or a remixing transfer vehicle (not shown) and a layer of paving material is applied to the work surface 101. In some instances, the paving machine 50 may push the haul truck 30 while the paving machine is simultaneously applying a layer of paving material and the haul truck is loading paving material into the paving machine.

Paving machine 50 may include a body 51, a material receiving unit such as a hopper 52 for storing paving material supplied via haul truck 30, and a material application system including a screed 53 for working paving material in a conventional manner. A conveyor system (not shown) transfers paving material from the hopper 52 to the screed 53. A prime mover such as engine 54 may be operatively connected to a ground engaging drive mechanism such as tracks 55. An operator station 56 may include a plurality of input devices 57 for controlling the paving machine 50 and one or more display devices 58 for displaying information relevant to the operation of the machine and a paving operation.

Paving machine 50 may include a paver control system 60 and a paver controller 61 generally similar or identical to the plant control system 21 and the plant controller 22 of the plant 20, respectively. The paver control system 60 and the paver controller 61 may be located on the paving machine 50 and may also include components located remotely from the machine such as any of the other machines of the paving system 10, at the plant 20, or at a command center (not shown). The functionality of paver controller 61 may be distributed so that certain functions are performed on the paving machine 50 and other functions are performed remotely.

Paving machine 50 may be equipped with a plurality of paver sensors 62 such as position sensing system 63 and a position sensor 64 generally similar to position sensing system 39 and position sensor 40 of haul truck 30, respectively. Further, the paving machine 50 may include a pitch angle sensor 65 for measuring the slope or inclination of the paving machine and a ground speed sensor 66 for determining the ground speed of the paving truck, with each sensor being generally similar to their counterpart on the haul truck 30.

Additional sensors may be provided such as a mix delivery or feed rate sensor 62 that may be used to determine the rate at which material from the hopper 52 is being fed by the conveyor to the screed 53. A hopper level or load sensor 63 may be provided to determine the height or amount of material within the hopper 52. Temperature sensors 69 may be provided at the hopper 52 and/or the screed 53 to monitor the temperature of the material within the hopper and at the screed. In addition, the paving machine 50 may include a push roller 70 with a push roller load sensor 71 where the push roller operates by engaging the haul truck 30 and the push roller load sensor operates to provide feedback to the paver controller 61 as to the force being applied by the paving machine while pushing the haul truck.

Information regarding the paving machine 50 and its payload may be stored or determined by paver controller 61 or any other portion of controller 13. Some of the information may be relatively static (i.e., static or fixed for each load from the haul truck 30) and other information may be dynamic or change during a paving operation. Examples of static information include a unique identifier associated with each load carried by a haul truck 30, the plant at which the paving material was mixed, and certain fixed characteristics of a load of paving material such as the amount of oil and the size of the aggregate. Dynamic information that may be stored or determined by the paver controller 61 or controller 13 and associated with the paving machine 50 and the material it is applying includes position, slope, and ground speed of the paving machine, and the thickness and temperature of the paving material being applied to the work surface 101.

Figure 3:
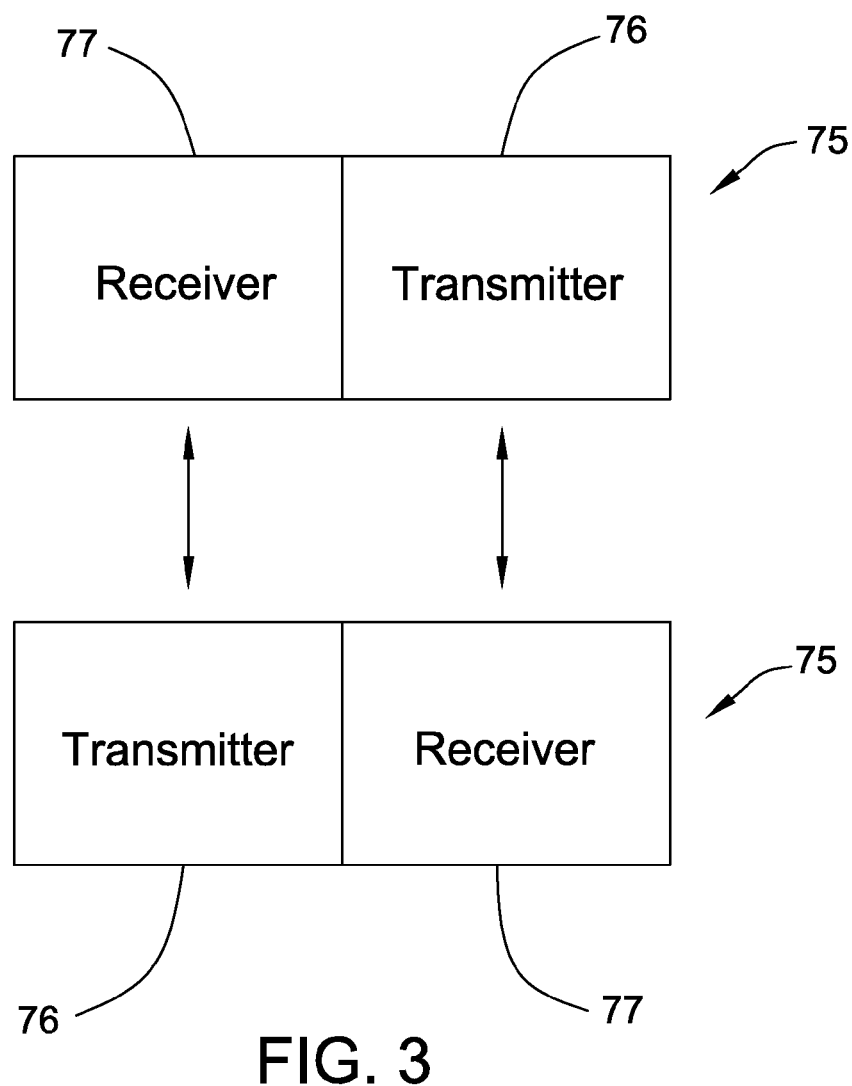
FIG. 3 depicts a schematic illustration of a wireless communications system.

Each of the plant 20, haul trucks 30, and paving machines 50 may include a wireless communications system 75 to permit wireless transmission of a plurality of instructions and information between the plant 20, the haul trucks 30, and the paving machines 50 as well as permit communication with other machines and systems remote from the plant, haul trucks, and paving machines. In one embodiment depicted in FIG. 3, each wireless communications system 75 may include a transmitter 76 for transmitting signals from one wireless communications system and a receiver 77 for receiving signals from a transmitter system of another wireless communications system. In some instances, the transmitter 76 and the receiver 77 may be combined as a transceiver system. In some embodiments, a haul truck 30 may only include a transmitter system.

Wireless communications systems 75 may implement or utilize any desired system or protocol including any of a plurality of communications standards. The desired protocols will permit communication between the plant 20, one or more haul trucks 30, one or more paving machines 50, and any other desired machines or systems. Examples of wireless communications systems or protocols that may be used by the wireless communications systems 75 include a wireless personal area network such as Bluetooth® (e.g., IEEE 802.15), a local area network such as IEEE 802.11b or 802.11g, a cellular network, or any other system or protocol for data transfer. Other wireless communications systems and configurations are contemplated. In some instances, wireless communications may be transmitted and received directly between the plant 20 and a machine or between machines. In other instances, the communications may be automatically routed without the need for re-transmission by remote personnel.

The control system 12 may include components located at the plant 20 as well as each of the machines of the paving system 10. More specifically, the control system 12 may include the plant control system 21 and the plant sensors 23, the truck control system 36 and the truck sensors 38, and the paver control system 60 and the paver sensors 62. Further, the controller 13 may include the plant controller 22, the truck controller 37, and the paver controller 61.

During operation, the wireless communications systems 75 of the plant 20, the haul truck 30, and the paving machines 50 may transmit to each other signals indicative of characteristics associated with each plant/machine, its operation, and its associated paving material. Examples of information that the plant 20 may transmit to each haul truck 30 (i.e., to the truck controller 37) include various aspects or characteristics of the load being transported by the haul truck. The information may be stored within the truck controller 37 for subsequent transmission to the paving machine 50 receiving the material or for any other purpose. As an example, the haul truck 30 may receive a unique identifier regarding each load of paving material with the identifier specifying the plant that produced the material, characteristics of the material such as the amount of oil and size of aggregate, the temperature during the loading process and the time at which the material was loaded, as well as the amount of material loaded.

Examples of information that the plant 20 may transmit to each paving machine 50 (i.e., to the paver controller 61) include information or characteristics of each batch of paving material, the amount of paving material mixed for the batch, the amount of material loaded onto haul trucks (i.e., the amount of material used), and the amount of material remaining in the holding location.

Examples of information that each haul truck 30 may transmit to the plant 20 (i.e., to the plant controller 22) include the location of the truck, its direction of travel, and the estimated time of arrival either at the plant or at a paving machine 50. In addition, the haul truck 30 may also communicate the type of truck including its capacity and whether the truck is hauling re-claimed or scrap material back to the plant 20.

Examples of information that each haul truck 30 may transmit to a paving machine 50 include characteristics of the haul truck as well as the paving material being hauled. Characteristics of the truck may include the type of haul truck 30, dimensions of certain aspects of the truck, the position of the truck, speed, and heading of the truck (or the time until arrival at the paving site 100), the slope or inclination of the work surface 101 on which the truck is operating, and any other desired information. The haul truck 30 may also transmit information regarding the load carried by the truck such as the type of material as well as the amount temperature of the load. Characteristics of the load of paving material may include specific identifiers or codes associated with the load such as those indicating the batch and plant at which the paving material was mixed, and the amount of paving material in the haul truck 30 and its current temperature.

Examples of information that each paving machine 50 may transmit to the plant 20 include the location of the paving machine and its direction of travel, the production rate or amount of paving material being applied per unit time (e.g., tons per hour), the total amount of paving material applied, and the amount of material that remains to be applied to complete the paving job. In addition, the paving machine 50 may also communicate to the plant 20 the temperature of the paving material in the hopper 52 and/or the temperature of the material or layer 102 being applied. Still further, an operator at the paving machine 50 may inform or provide notice to the plant 20 of the degree to which the paving material delivered by the haul truck 30 has become segregated. In some instances, the amount of segregation may exceed a desired threshold and the load delivered by the haul truck 30 may be rejected. In other instances, the operator may inform the plant 20 so that personnel at the plant may change characteristics of the paving material (e.g., the size or combination of sizes of the aggregate) or the haul truck loading process to reduce the amount of segregation at the load delivery site.

Examples of information that a paving machine 50 may transmit to a haul truck 30 include the location of the paving machine and its direction of travel, the speed at which it is moving, and the grade on which it is moving. In addition, the paver controller 61 may transmit the load on the push roller 70, the level of hopper 52, the available capacity within the hopper, and the time until the hopper is empty.

Control system 12 and components thereof may use information from the plant 20, haul trucks 30, paving machines 50, and systems outside the paving system 10 to improve the communication between components of the paving system and the efficiency of the paving process.

The controller 13 including plant controller 22 may utilize information from the haul trucks 30 and the paving machines 50 to generate plans for loading the haul trucks at the plant 20 and directing the haul trucks to the desired paving machines in an optimal or desired manner. More specifically, the controller 13 may analyze the rate at which paving material is being laid or applied at each paving machine 50 together with the temperature of the paving material at the paving machines. The controller 13 may also identify the location of each haul truck 30, its heading and speed and determine the estimated arrival time at the plant 20 or a paving machine 50 for each haul truck. The controller 13 may also track the amount of material within each haul truck 30 that is moving towards a paving machine 50. If the haul truck 30 includes a temperature sensor 44, the controller 13 may also track the temperature of the load within the haul truck. In some instances, the controller 13 may also receive traffic information data that is applicable to potential routes for the haul trucks 30 to travel between the plant 20 and the paving site 100.

Using all or some of this information as an input, the controller 13 may generate timing plans and/or schedules for the arrival and/or loading of the haul trucks 30, suggested or desired routes from the plant 20 to the paving site 100, and a suggested rate of travel or speed. The controller 13 may thus utilize an arrival timing plan to coordinate the arrival of the haul trucks 30 at the paving site 100 to minimize or reduce the amount of time that the haul trucks remain waiting at the paving site.

Such operation may reduce the amount of energy used at the plant 20 by allowing a reduction in the temperature of the paving material at the time it is loaded into the haul trucks 30 at the plant either because the temperature of the paving material is being tracked or monitored as the paving material is being applied to the work surface 101 or because the haul trucks are spending less time waiting before the paving material is loaded into the paving machines 50.

By communicating to the plant 20 that a haul truck 30 that will be arriving at the plant includes re-claimed material, the planning for the re-claimed material may be begun well before the haul truck arrives and thus the desired location for dumping the re-claimed material may be determined and communicated in an efficient manner. In another aspect, by tracking the routes of the haul trucks 30 in view of available traffic information data, the fastest or most preferred routes may be stored or generated for future use.

The controller 13 including plant controller 22 may utilize information from the haul trucks 30 and the paving machines 50 to generate plans for production and processing of paving material at the plant 20 in an optimal or desired manner. More specifically, the controller 13 may analyze the rate at which paving material is being laid or applied at each paving machine 50 together with the temperature of the paving material at the paving machines. The controller 13 may also identify the location of each haul truck 30, its heading and speed and determine the estimated arrival time at the plant 20 or a paving machine 50 for each truck. The controller 13 may also track the amount of material within each haul truck 30 that is moving towards a paving machine 50. If the haul truck 30 includes a temperature sensor 44, the controller 13 may also track the temperature of the load within the haul truck. In some instances, the controller 13 may also receive traffic information regarding potential routes for the haul trucks 30 to travel between the plant 20 and the paving site 100.

Using all or some of this information as an input, the controller 13 may generate plans and/or schedules for processing the paving material at the plant 20. The plans and/or schedules may include when to start processing the batch of paving material and the temperature at which it is maintained in the holding location. By monitoring the rate at which paving material is being laid, and the location, speed, and load within each truck, the controller 13 may also determine when each haul truck 30 should be loaded and directed to the paving site 100. The controller 13 may thus coordinate the arrival of the haul trucks 30 at the paving site 100 to minimize or reduce the amount of time that the haul trucks remain waiting at the paving site.

Such operation may increase the efficiency of the paving system by optimizing the production of paving material and loading the haul trucks 30 at a desired time in order to reduce idling time while at the paving site 100 but still maintaining an adequate supply of paving material so that the paving machines 50 remain productive. Reducing idling time and loading the haul trucks 30 only shortly before a scheduled departure time may also allow a reduction in the temperature of the paving material at the time it is loaded into the haul trucks 30 at the plant 20.

The controller 13 including paver controller 61 may use the information regarding each of the haul truck 30 and the paving machine 50 to optimize the paving process. In doing so, the controller 13 may determine or calculate information related to a paving operation based upon the characteristics and operation of each machine and its payload. For example, the controller 13 may determine the time until the hopper 52 is empty based upon the feed rate of the conveyor system as well as the time until a haul truck 30 supply material is empty based upon the angle of the dump body 35 relative to chassis 31, the type and amount of load in the dump body, and the temperature of the load. The controller 13 may also determine the distance between any haul truck 30 and the paving machine 50 and the estimated time of arrival of any identified haul trucks.

In addition, the paver control system 60 may operate to control the operation of both of the haul truck 30 and the paving machine 50, either simultaneously or independently. For example, in some instances, it may be desirable to permit the paving machine 50 to control the brakes and/or the drivetrain of the haul truck 30. In another example, it may be desirable to permit the paving machine 50 to control the position of the dump body 35 relative to the chassis 31 in order to control the flow of material into the hopper 52. Still further, it may be desirable to permit the paving machine 50 to control the steering of the haul truck 30 to maintain the haul truck in a position centered relative to the hopper 52 of the paving machine 50. In each of these instances, operation of the haul truck 30 may be controlled automatically based upon operation of the paving machine 50 or the paving machine operator may have the ability to control aspects of the haul truck from the input devices 57 of the paving machine.

Figure 4:
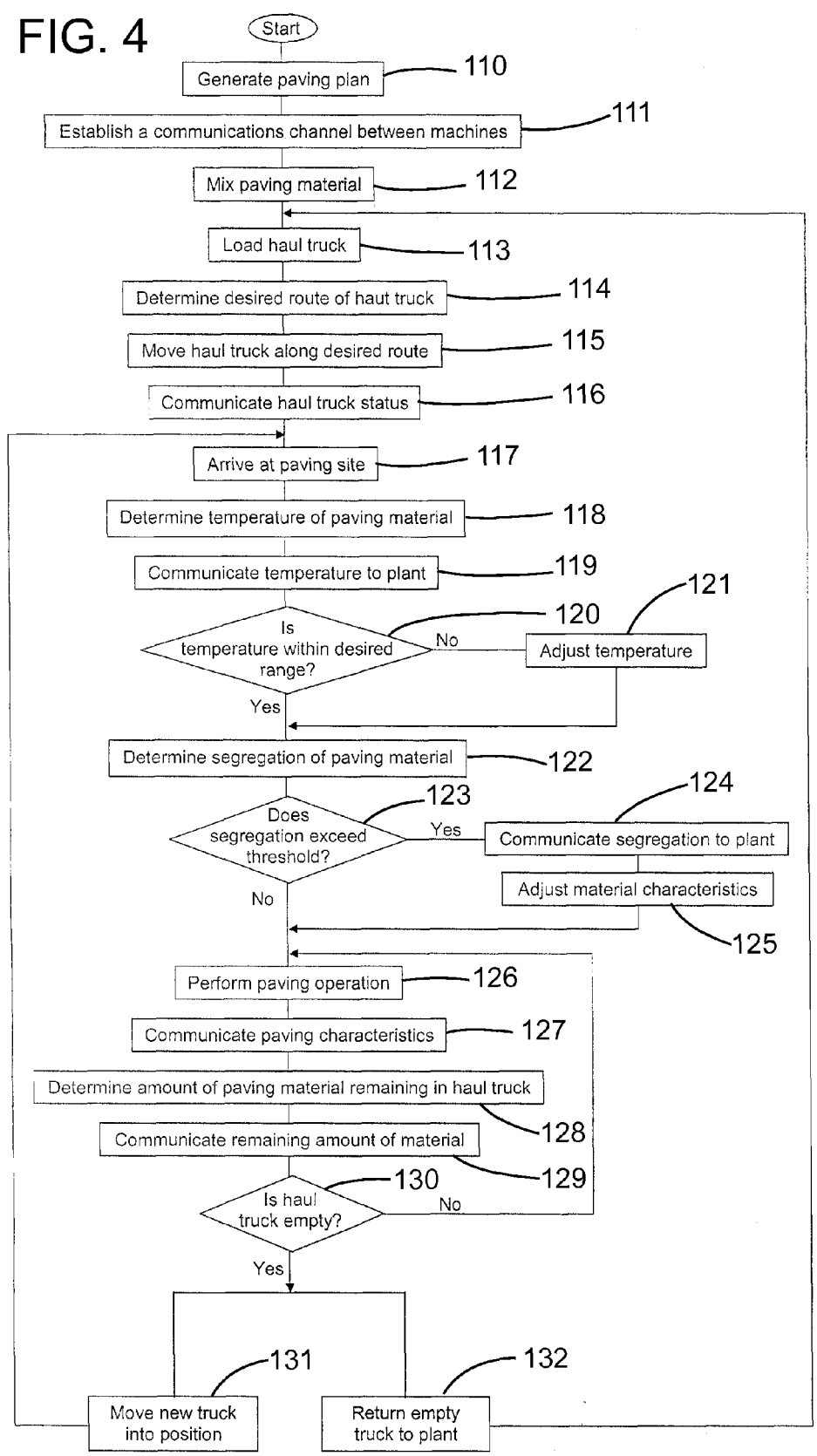
FIG. 4 depicts a flowchart illustrating operation of the paving system.

Referring to FIG. 4, a flowchart of the operation of the paving system 10 is depicted. At stage 110, a paving plan for a desired time period (e.g., a day) may be determined or entered into the controller 13. The paving plan may include the number of available haul trucks 30 and paving machines 50 and establish an amount of material to be laid including the distance and thickness as well as the characteristics of the paving material such as the amount of oil, the size of the aggregate, and any fillers.

An initial estimate of the desired temperature at which the paving material is to be loaded into the haul trucks 30 may be made based upon the number of available haul trucks 30 and paving machines 50 together with the distance between the plant 20 and the paving site 100. In addition, the ambient temperature of the route or path of the haul trucks 30 together with traffic conditions along the route between the plant 20 and the paving site 100 may also be used to determine an initial estimate of the desired paving material temperature. Based upon distance and thickness of the paving material to be laid, the amount of material to be mixed at the plant 20 may be determined.

At stage 111, the wireless communications systems 75 of the plant 20, the haul trucks 30, and the paving machines 50 may establish a communications channels or connections amongst or between the systems to permit communications between each of the machines as well as with the plant. In one example, a direct communications channel may be established between two wireless communications systems 75 through a cellular connection. In an example utilizing a local area network (in which the wireless communications systems 75 are relatively close together), the connection channel may be established upon identifying and coupling based upon unique identifiers associated with the wireless communications systems. In an example using a Bluetooth® system, one wireless communications system 75 may operate in a "master" or "advertising" mode in which it is searching for one or more other wireless communications systems that are in "slave" or "scanner" mode. Upon the relative distance between wireless communications systems 75 becoming sufficiently small (i.e., being within the range of the wireless communications systems), the wireless communications systems may automatically establish a communications channel or connection or become "paired."

At stage 112, a batch of paving material having the desired characteristics may be mixed at the plant 20 and stored at a designated holding location at the plant. The paving material may be stored at the initial estimate of the desired haul truck loading temperature. At stage 113, a load of paving material may be transferred or loaded into a haul truck 30.

A recommended plan or route for the haul truck 30 may be generated at stage 114 by the controller 13 based upon an electronic map of the position and speed of haul trucks 30, together with the rate at which the paving machines 50 are apply paving material to the work surface 101. The route may also be based upon the current or anticipated traffic and weather conditions received by the controller from traffic information data and other available information. The plan may also include information directed to the urgency for a haul truck 30 to arrive at the paving site 100 at the designated time in order to avoid an interruption in the paving process. In one example, if the amount of material at the paving site 100 is relatively low, a haul truck operator may be instructed or requested to postpone a break until after delivering the load of paving material to the paving site 100. In another example, an operator who will likely be waiting at the plant 20 before loading a haul truck or waiting at the paving site 100 be informed of such a delay and may elect to take a break before loading the haul truck 30.

At stage 115, the haul truck 30 may travel along a recommended route from the plant 20 to the paving site 100.

At stage 116, the haul truck 30 may transmit its current position, speed, and heading together with information regarding its load to controller 13. The information regarding the load may include the amount of material and its temperature. The controller 13 may generate an electronic map of all of the haul trucks 30 and the information provided by the haul truck may be used to update the electronic map.

At stage 117, the haul truck 30 arrives at the paving site 100. The temperature of the paving material may be determined at stage 118. In one example, the temperature as it is loaded into the hopper 52 of the paving machine 50 may be determined based upon temperature sensor 69 associated with the hopper. In another example, the temperature may be determined based upon temperature sensor 44 associated with the haul truck 30. The temperature of the paving material may be communicated to the plant 20 at stage 119. If the temperature is determined based upon the temperature sensor 44 of the haul truck 30, the temperature of the material may also be communicated directly to the paving machine 50. In addition or in the alternative, the temperature of the paving material as it is being laid upon the work surface 101 as determined by the temperature sensor 69 at the screed 53 may be communicated to the plant 20.

At decision stage 120, the controller 13 may determine whether the temperature of the paving material is within a specified or desired range. More specifically, the controller 13 may determine whether the temperature exceeds an upper temperature threshold or is less than a lower temperature threshold. If the temperature exceeds the upper threshold, energy costs may be reduced at the plant 20 by reducing the temperature of the paving material at the holding location. If the temperature is less than the lower threshold, it may be desirable to increase the temperature of the paving material at the holding location to reduce the likelihood that a load of paving material will be rejected because it is too cold at delivery.

At stage 121, the controller 13 may generate command signals or instructions to automatically or manually adjust the temperature of the paving material at the holding location. In addition, if the temperature is below an operational threshold, the entire load within the haul truck 30 may be rejected and another haul truck may be directed to approach the paving machine 50 and the process re-started at stage 117.

At stage 122, the paving material supplied by the haul truck 30 may be inspected, visually or otherwise, to determine if the amount of separation of the paving material exceeds a separation threshold at decision stage 123. If the separation of the paving material exceeds the separation threshold, the degree of separation may be communicated at stage 124 to the plant 20 by the paving machine 50. At stage 125, the controller 13 may generate instructions to automatically or manually adjust the characteristics of the paving material at the holding location or the loading process to reduce the amount of separation as the paving material is transported in haul truck 30 from the plant 20 to the paving site 100.

At stage 126, the haul truck 30 may be aligned with a paving machine 50 and the paving operation begun as described in more detail below. As the paving machine 50 lays the paving material, a plurality of characteristics of the paving operation and the paving material may be communicated to the plant 20 at stage 127. For example, the rate at which the material is being laid including the speed of the paving machine 50 and the thickness of the material may be communicated to the plant 20 to inform the plant of the rate at which material is being used. In addition, the temperature of the paving material may also continue to be communicated to the plant 20.

In some embodiments, information from the plant 20 regarding the usage of paving material may be communicated to the paving machine 50. For example, the plant 20 may inform the paving machine 50 of the rate at which the paving material is being used based upon how much is leaving the plant. The amount of material that has left the plant 20 (less the paving material in transit) may be used to confirm that the thickness of the paving layer 102 as determined by the paving machine 50 is correct. In addition, the plant 20 may also provide information to the paving machine 50 as to how much material of the batch of paving material for a particular job is remaining at the holding location at the plant.

The amount of material remaining in the dump body 35 of the haul truck 30 may be determined at stage 128 and communicated at stage 129 to the plant 20 and/or to a haul truck 30 that is the next scheduled truck to supply paving material to the paving machine 50. At decision stage 130, the controller 13 may determine whether the haul truck 30 is empty. If the haul truck 30 is not empty, stages 126-130 may be repeated.

Once the haul truck 30 is empty, the next haul truck may be moved at stage 131 into position to load the paving machine 50 and the paving process continued by repeating stages 117-132. The empty haul truck 30 may travel back at stage 132 to the plant 20 where it is re-loaded with paving material and the process is continued by repeating stages 113-132. The route utilized by the haul truck 30 between the paving site 100 and the plant 20 may be determined by the controller 13.

In some instances, it may be desirable to generate a timing plan to stagger the loading process so that the haul trucks 30 arrive at the paving site 100 shortly before additional paving material is needed to minimize the amount of time that the trucks spend idling. In addition, recommended routes for the haul trucks 30 to travel between the plant 20 and the paving site 100 may be updated periodically or in real-time based upon updates to traffic information data. As discussed above, the recommended route may be generated by the controller 13 based upon or in view of current or anticipated traffic conditions.

Figure 5:
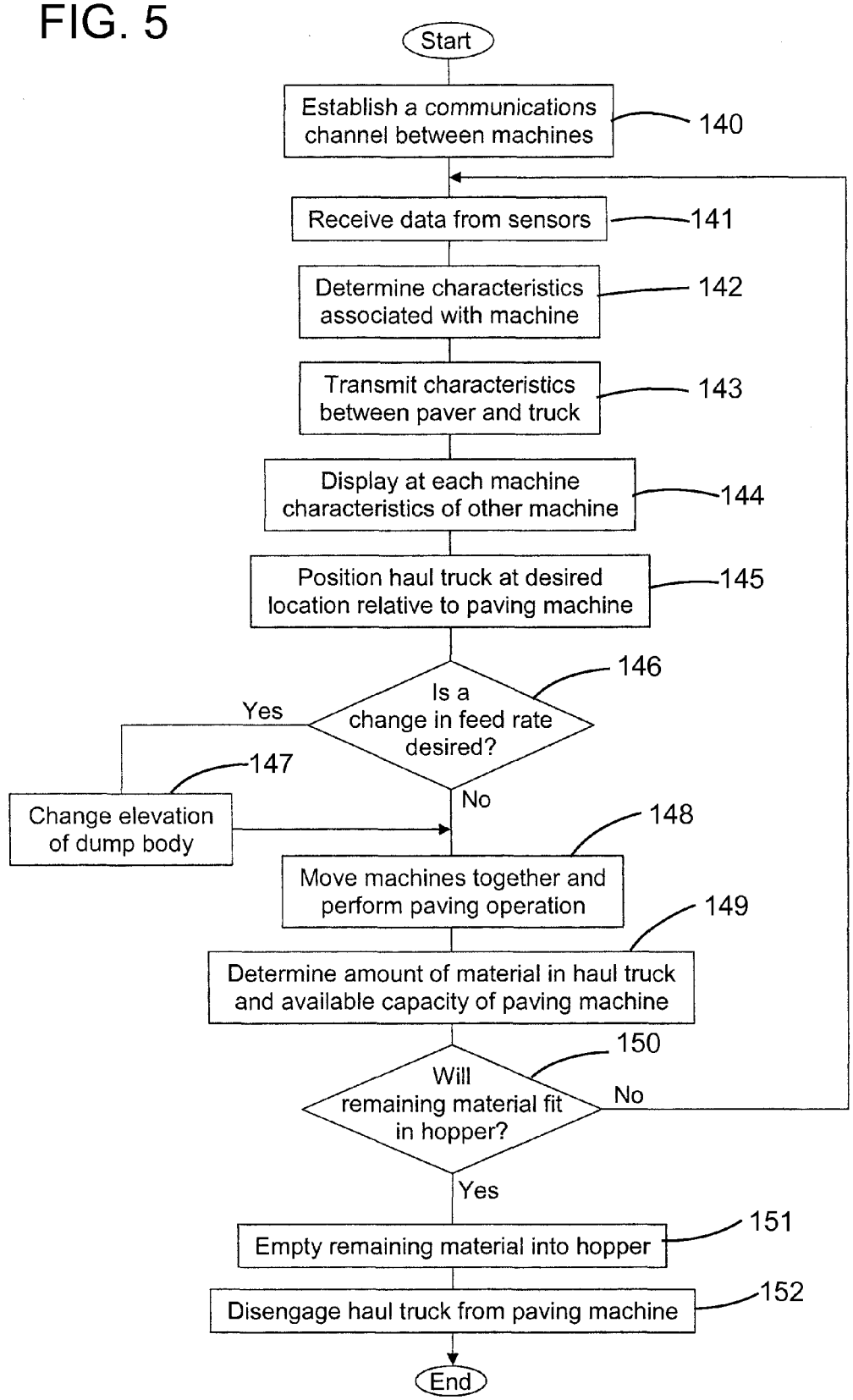
FIG. 5 depicts a flowchart illustrating a paving operation.

Referring to FIG. 5, a flowchart of an exemplary paving operation utilizing a haul truck 30 and a paving machine 50 is depicted. At stage 140, the wireless communications systems 75 of the haul truck 30 and the paving machine 50 may establish a communications channel or connection between the two systems to permit communications between the two machines. In one example, a direct communications channel may be established between the two machines through a cellular connection. In an example utilizing a local area network, the connection channel may be established upon identifying and coupling between unique identifiers associated with a pair of machines. In an example using a Bluetooth® system, the paving machine 50 may operate in a "master" or "advertising" mode in which it is searching for one or more machines that are in "slave" or "scanner" mode. Upon the relative distance between haul truck 30 and paving machine 50 becoming sufficiently small (i.e., being within the range of the wireless communications systems 75), the wireless communications systems of the two machines will establish a communications channel or connection or become "paired."

At stage 141, the paver controller 61 may receive data or signals from the sensors of the paving machine 50 and the truck controller 37 may receive data or signals from the sensors of the haul truck 30. At stage 142, each of the paver controller 61 and the truck controller 37 may determine characteristics associated with the respective machines. These characteristics may include positional information and operating performance of each machine as well as load characteristics or information related to the payload of each machine.

The transmitter 76 of the wireless communications system 75 of the haul truck 30 may transmit at stage 143 one or more characteristics associated with the operation of the haul truck to the receiver 77 of the wireless communications system of the paving machine 50. The characteristics may include the type of haul truck 30, dimensions of certain aspects of the truck, the position (e.g., GPS coordinates) of the truck (or the time until arrival at the paving site), the slope or inclination of the work surface on which the truck is operating, and any other desired information. The wireless communications system 75 of the haul truck 30 may also transmit load characteristic signals regarding the load carried by the truck such as the type of material as well as the amount temperature of the load. In addition, the wireless communications system 75 may also transmit specific identifiers or codes associated with the load such as those indicating the batch and plant at which the paving material was mixed.

At stage 143, the transmitter 76 of the wireless communications system 75 of the paving machine 50 may also transmit operating signals indicative of one or more characteristics associated with the operation of the paving machine to the receiver 77 of the wireless communications system of the haul truck 30. For example, while the haul truck 30 is in transit, the paving machine 50 may transmit the status of its hopper 52 such as the time until the hopper is empty. Based upon the distance between the haul truck 30 and the paving machine 50 and the time until the hopper 52 is empty, the operator of the haul truck 30 may be able to estimate the urgency required to reduce the likelihood that operation of the paving machine 50 will be interrupted due to a lack of paving material.

Once the haul truck 30 is in proximity to the paving machine 50, the paving machine may transmit its position and speed to the haul truck to simplify positioning of the haul truck relative to the paving machine.

At stage 144, all or some of the characteristics associated with the haul truck 30 may be displayed on display device 58 at the operator station 66 of paving machine 50 and all or some of the characteristics associated with the paving machine 50 may be displayed on a display device (not shown) within the cab 33 of haul truck 30.

At stage 145, the haul truck 30 may be moved relative to the paving machine 50 to position the end of the dump body 35 above the hopper 52 of the paving machine. The haul truck 30 may, if desired, use the GPS coordinates of the paving machine 50 together with its own GPS coordinates to assist in positioning the haul truck relative to the paving machine. In one example, the operator of the haul truck 30 may use the GPS coordinates of the paving machine 50 together with the GPS coordinates of the haul truck to position the haul truck in a desired position. In another example, the controller 13 of the haul truck 30 may generate commands to move the haul truck in a semi-autonomous manner to a desired position relative to the paving machine 50.

In a further example, the operator of the paving machine 50 may use the GPS coordinates of the haul truck 30 together with the GPS coordinates of the paving machine 50 to position the paving machine relative to the haul truck. In another example, optical sensors (not shown) may be used to coordinate the positions of the machines. In still another example, the controller 13 of the paving machine 50 may generate commands to relatively move in a semi-autonomous manner the haul truck and paving machine to a desired position relative to the paving machine 50.

Based upon the amount of material within the hopper 52 of the paving machine and the rate at which the material is being applied to the work surface 101, a determination may be made at decision stage 146, either by the operator of the paving machine 50 or by paver controller 61, as to whether a change in the elevation of the dump body 35 relative to chassis 31 of haul truck 30 is desirable.

If an increase or decrease in the feed rate is desired, a change in elevation of the dump body may be made at stage 147. In one example, the paving machine operator may generate instructions to change the elevation through the paver controller 61 and use the transmitter 76 of the wireless communications system 75 of the paving machine to transmit the instructions to the haul truck 30. The instructions may be received by the receiver 77 of the wireless communications system 75 of the haul truck 30. The truck controller 37 may use the instructions from the paving machine to automatically change the elevation of the dump body 35 as desired. In another example, the instructions may be received within the haul truck 30 and an operator may operate input devices of the truck to manually change the elevation of the dump body.

Either upon changing the elevation of the dump body at stage 147 or, if no change is desired, at decision stage 146, the haul truck 30 and the paving machine 50 may move together at stage 148 to perform the desired paving operation. In one embodiment, the paving machine 50 may engage and push the haul truck 30 so that the drive system of the paving machine operates to propel both machines. In another embodiment, the paving machine 50 may determine the speed at which the pair of machines will operate and the wireless communications system 75 of the paving machine may transmit the desired speed to the wireless communications system 75 of the haul truck 30. In a manual operation, the operator of the haul truck 30 may then operate the truck at the desired speed. In an automatic operation, signals from the paver controller 61 of the paving machine 50 may direct the truck controller 37 to operate the machine at the desired speed.

In some instances, the work surface 101 upon which the haul truck 30 and the paving machine 50 are operating may not be level. If both the haul truck 30 and the paving machine 50 are traveling uphill, gravity will force the haul truck against the paving machine and the paving operation may continue as desired. However, in any instance in which the haul truck 30 is traveling downhill (i.e., when both the paving machine 50 and the haul truck are traveling downhill or when the haul truck reaches a crest in a hill), the haul truck may tend to roll ahead of the paving machine. In such case, the paver controller 61 of the paving machine 50 may be configured to monitor the position and speed of the haul truck and direct the truck controller 37 to apply the brakes of the haul truck as necessary to maintain the truck in the desired position and/or at the desired speed relative to the paving machine and/or maintain a desired push roller displacement or push roller pressure.

Paver control system 60 may also be configured to maintain the alignment between the haul truck 30 and the paving machine 50. For example, the paver controller 61 or the truck controller 37 may utilize data from their respective position sensing systems to steer the haul truck 30 to maintain the centerline of the dump body 35 along the centerline of hopper 52 of the paving machine 50. In another embodiment, the paving machine 50 and/or the haul truck 30 may include sensors (e.g., optical sensors) that provide feedback to the controller 13 to maintain the two machines in alignment.

At stage 149, the paver controller 61 of the paving machine 50 may determine the available capacity within the hopper 52 based upon signals from the hopper level sensor 31 and truck controller 37 of the haul truck 30 may determine the extent or amount of material remaining in dump body 35 based upon signals from the load monitoring system 89. At decision stage 150, the controller 13 may determine whether all of the remaining material in the dump body 35 will fit within the hopper 52. If the remaining material will not fit within the hopper 52, the paving operation may continue and stages 141-150 repeated.

If the remaining material will fit within the hopper 52, the dump body 35 may be elevated at stage 151 by the operator of the paving machine 50, the operator of the haul truck 30, or automatically by the truck controller 37 or the paver controller 61 to empty the haul truck. The haul truck 30 may be disengaged from the paving machine 50 at stage 152 and a fully loaded haul truck moved into position relative to the paving machine in order to continue the paving operation in an efficient manner.

Figure 6:
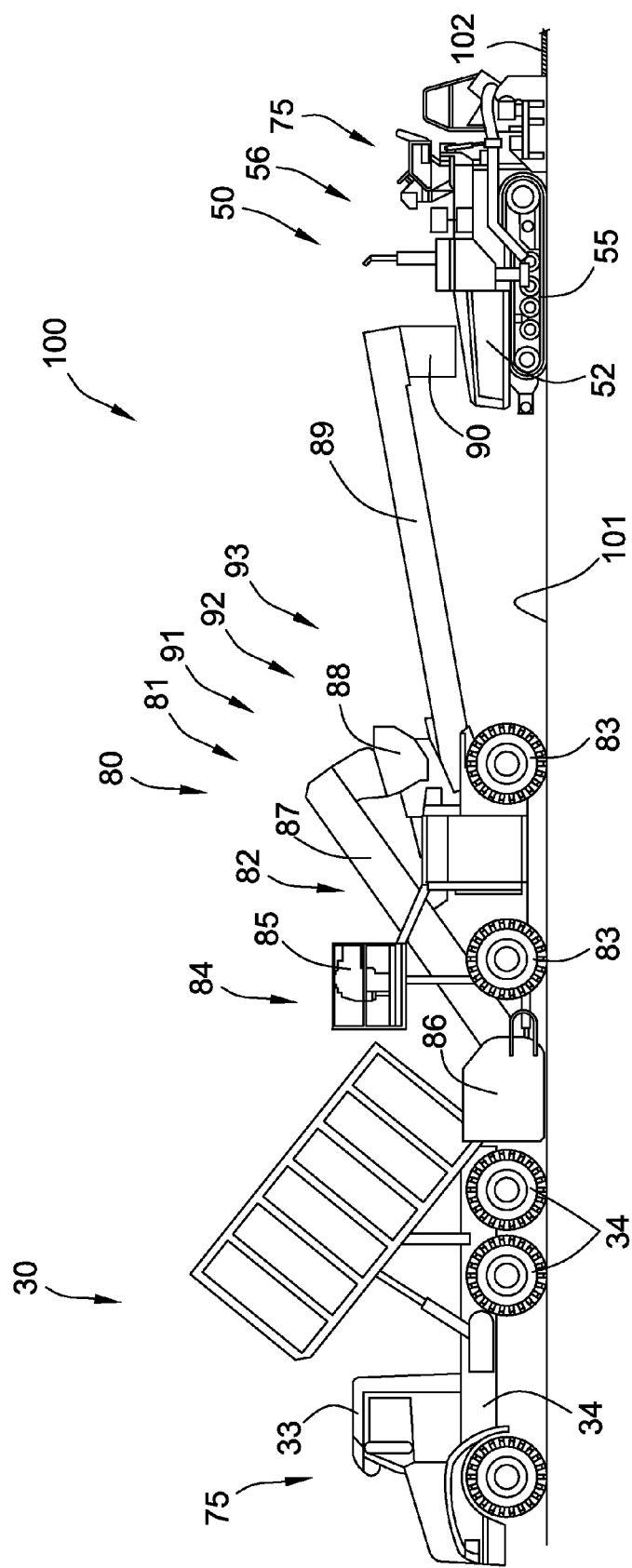
FIG. 6 depicts a schematic illustration similar to FIG. 2 but further including a remixing transfer vehicle between the paving machine and the haul truck.

Referring to FIG. 6, a paving machine 50 is depicted in operation with a remixing transfer vehicle 80 and a haul truck 30. Remixing transfer vehicle 80 permits material that has been segregated by size and/or temperature to be remixed before being fed into hopper 52 of paving machine 50. Remixing transfer vehicle 80 includes a material transfer and remix system 81 and a prime mover such as an engine 82 operatively connected to a ground engaging drive mechanism such as wheels 83. An operator station 84 may include a plurality of input devices 85 for controlling the remixing transfer vehicle 80.

The material transfer and remix system 81 may include a dump hopper 86 into which paving material may be dumped, a conveyor 87 for conveying or transporting material from the dump hopper to a remix hopper 88 in which the paving material may be remixed and re-heated. The remixing transfer vehicle 80 may further include a swingable or pivotable transfer conveyor 89 for conveying or transporting material from the remix hopper 88 to an outlet 90. By aligning outlet 90 with hopper 52 of paving machine 50, material exiting from the outlet may be conveyed from the dump hopper 86 to the hopper 52 of the paving machine after the remixing operation has been completed.

Remixing transfer vehicle 80 may include a vehicle control system 91 and a vehicle controller 92 generally similar or identical to the truck control system 36 and the truck controller 37 of the haul truck 30, respectively. The remixing transfer vehicle 80 may also include a plurality of vehicle sensors generally indicated at 93 generally similar or identical to the truck sensors 38 of the haul truck 30 and/or the paver sensors 62 of the paving machine 50. In addition, the remixing transfer vehicle 80 may also include a wireless communications system generally indicated at 75 generally similar or identical to the wireless communications systems 75 of the haul trucks 30 and the paving machines 50.

Operation of the paving machine 50 with remixing transfer vehicle 80 may be substantially identical to the operation of the paving machine with the haul truck 30 and the description thereof is not repeated herein. In some instances, it may be desirable to operate the paving machine 50 with an remixing transfer vehicle 80 and a haul truck 30 directly supplying or feeding paving material to the remixing transfer vehicle so that the three machines are moving together along the work surface. In such case, each of the machines may be communicating with the others and the paver control system 60 may be configured to permit the operator of the paving machine 50 to control the operation of the haul truck 30 and the remixing transfer vehicle 80 as well as the paving machine in a manner similar to that described above with respect to controlling the operation of the haul truck.

INDUSTRIAL APPLICABILITY

The industrial applicability of the system described herein will be readily appreciated from the forgoing discussion. The foregoing discussion is applicable to paving systems 10, that may include one or more plant 20, one or more supply machines such as haul trucks 30, and one or more paving machines 50 that are operated at a work site such as a paving site 100 to pave a work surface 101. A paving operation may be used at a construction site, a roadwork site, a parking lot, or any other area in which the application of paving material to a work surface 101 is desired.

The foregoing system provides improved communication through the use of wireless communications system 75 to permit a more efficient paving operation. Characteristics of the plant 20 and the paving material thereat may be communicated to the supply machines and the paving machines 50. Characteristics of the supply machines and the paving material transported thereby may be communicated to the plant 20 and the paving machines 50. Characteristics of the paving machine 50 and the paving material being applied to the work surface 101 may be communicated to the plant 20 and the haul truck 30. The improved sharing of information amongst the plant 20 and the machines may improve the efficiency of a paving operation.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for controlling a paving system, comprising:
   a plurality of supply machines, each supply machine including:
      a first ground engaging drive mechanism to propel the supply machine;
      a material transport unit in which a load of paving material may be transported;
      a first position sensor for determining a position of the supply machine;
      a first wireless communications system on the supply machine; and
      a first controller configured to:
         determine the position of the supply machine; and
         transmit supply machine position signals indicative of the position of the supply machine; and
   a paving machine including:
      a second ground engaging drive mechanism mover to propel the paving machine;
      a material receiving unit for receiving paving material from the supply machine;
      a material application system for applying the paving material to a work surface;
      a second sensor for determining a rate at which the paving material is being applied to the work surface;
      a second wireless communications system on the paving machine; and
      a second controller configured to:
         determine the rate at which the paving material is being applied to the work surface; and
         transmit the rate at which the paving material is being applied; and
   a temperature sensor associated with one of the plurality of supply machines and the paving machine for determining a temperature of paving material at the paving machine; and
   a plant for producing a batch of paving material including:
      a holding location at which the batch of paving material is held;
      a batch temperature sensor for determining a batch temperature of the batch of paving material;
      a third wireless communications system at the plant; and
      a third controller configured to:
         determine the batch temperature;
         receive signals indicative of the position of each supply machine;
         receive traffic information data indicative of traffic conditions between the plant and the paving machine;
         receive signals indicative of the temperature of paving material at the paving machine; and
         generate instructions indicative of a desired route for each supply machine between the plant and the paving machine based upon the position of each supply machine, the traffic information data, the batch temperature, and the temperature of paving material at the paving machine.

2. The system of claim 1, wherein each of the plurality of supply machines further includes a ground speed sensor for determining a ground speed and heading of a supply machine, the first controller is further configured to transmit ground speed and heading signals indicative of the ground speed and heading of the supply machine, and the third controller is configured to generate the instructions indicative of the desired route for each supply machine between the plant and the paving machine based further upon the ground speed and heading of each of the plurality of supply machines.

3. The system of claim 1, wherein the paving machine further includes a second position sensor for determining a position of the paving machine, and the third controller is configured to generate the instructions indicative of the desired route for each of the plurality of supply machines between the plant and the paving machine based further upon the position of the paving machine.

4. The system of claim 1, wherein the third controller is further configured to generate instructions indicative of a timing plan for loading each of the plurality of supply machines at the plant based upon the position of each supply machine, the traffic information data, and the temperature of paving material at the paving machine.

5. The system of claim 4, wherein the third controller is further configured to determine an amount of paving material remaining from the batch of paving material and the timing plan is further based upon the amount of paving material remaining.

6. The system of claim 4, wherein the third controller is further configured to generate instructions indicative of an arrival timing plan for each of the plurality of supply machines at the plant based upon the position of each supply machine, the traffic information data, and the temperature of paving material at the paving machine.

7. The system of claim 1, wherein the third controller is further configured to generate instructions indicative of a speed for each of the plurality of supply machines between the plant and the paving machine based upon the position of each supply machine, the traffic information data, and the temperature of paving material at the paving machine.

8. The system of claim 1, wherein the temperature sensor is located on one of the plurality of supply machines.

9. The system of claim 1, wherein the temperature sensor is located on the paving machine.

10. The system of claim 9, wherein the temperature sensor is located adjacent a hopper of the paving machine.

11. The system of claim 9, wherein the temperature sensor is located adjacent a screed of the paving machine.

12. The system of claim 1, wherein each of the plurality of supply machines further includes a load monitoring system for determining an amount of material within each supply machine, the first controller is further configured to transmit load signals indicative of the amount of material within the supply machine, and the third controller is configured to generate the instructions indicative of the desired route for each supply machine between the plant and the paving machine based further upon the amount of material within each supply machine.

13. A method of controlling a paving system, comprising:
propelling a plurality of supply machines, each of the plurality of supply machines having a material transport unit in which a load of paving material may be transported, at least some of the plurality of supply machines transporting paving material;
determining a position of each of the plurality of supply machines;
transmitting via a first controller supply machine position signals indicative of the position of each supply machine;
propelling a paving machine, the paving machine including a material receiving unit for receiving paving material from one of the plurality of supply machines and a material application system for applying a paving material to a work surface;
determining a rate at which the paving material is being applied to the work surface by the material application system;
transmitting via a second controller the rate at which the paving material is being applied;
determining a temperature of paving material at the paving machine;
producing a batch of paving material at a plant and holding the batch of paving material at a holding location;
determining a batch temperature of the batch of paving material;
receiving at a third controller signals indicative of the position of each supply machine;
receiving at the third controller traffic information data indicative of traffic conditions between the plant and the paving machine;
receiving at the third controller signals indicative of the temperature of paving material at the paving machine; and
generating at the third controller instructions indicative of a desired route for each supply machine between the plant and the paving machine based upon the position of each supply machine, the traffic information data, the batch temperature, and the temperature of paving material at the paving machine.

14. The method of claim 13, further including determining a ground speed and heading of each of the plurality of supply machines, transmitting via the first controller ground speed and heading signals indicative of the ground speed and heading of each supply machine, and generating via the third controller the instructions indicative of the desired route for each supply machine between the plant and the paving machine based further upon the ground speed and heading of each of the plurality of supply machines.

15. The method of claim 13, further including determining a position of the paving machine, and generating the instructions indicative of the desired route for each of the plurality of supply machines between the plant and the paving machine based further upon the position of the paving machine.

16. The method of claim 13, further including generating instructions indicative of a timing plan for loading each of the plurality of supply machines at the plant based upon the position of each supply machine, the traffic information data, and the temperature of paving material at the paving machine.

17. The method of claim 16, further including determining an amount of paving material remaining from the batch of paving material and generating the timing plan based upon the amount of paving material remaining.

18. The method of claim 16, further including generating instructions indicative of an arrival timing plan for each of the plurality of supply machines at the plant based upon the position of each supply machine, the traffic information data, and the temperature of paving material at the paving machine.

19. The method of claim 13, further including generating instructions indicative of a speed for each of the plurality of supply machines between the plant and the paving machine based upon the position of each supply machine, the traffic information data, and the temperature of paving material at the paving machine.

20. The method of claim 13, further including determining an amount of material within each supply machine, transmitting load signals indicative of the amount of material within the supply machine, and generating the instructions indicative of the desired route for each supply machine between the plant and the paving machine based further upon the amount of material within each supply machine.

* * * * *